(12) United States Patent
Thomas

(10) Patent No.: US 8,936,136 B2
(45) Date of Patent: Jan. 20, 2015

(54) BRAKE CALIPER ADJUSTMENT MECHANISM

(75) Inventor: John L. Thomas, Cedarburg, WI (US)

(73) Assignee: HB Performance Systems, Inc., Mequon, WI (US)

( * ) Notice: Subject to any disclaimer, the term of this patent is extended or adjusted under 35 U.S.C. 154(b) by 188 days.

(21) Appl. No.: 13/306,689

(22) Filed: Nov. 29, 2011

(65) Prior Publication Data

US 2013/0133991 A1 May 30, 2013

(51) Int. Cl.
*F16D 65/44* (2006.01)
(52) U.S. Cl.
USPC .......................................... 188/26; 188/73.31
(58) Field of Classification Search
CPC . F16D 65/0056; F16D 65/0062; F16D 65/42; F16D 65/44; F16D 65/46
USPC ........................ 188/73.31, 205 R, 26, 24.19
See application file for complete search history.

(56) References Cited

U.S. PATENT DOCUMENTS

| | | | |
|---|---|---|---|
| 3,765,511 A | 10/1973 | Toyomasu | |
| 3,848,707 A | 11/1974 | Brooks | |
| 4,596,313 A | 6/1986 | Metoyer | |
| 5,607,031 A | 3/1997 | Hollars | |
| 5,979,609 A * | 11/1999 | Tsai | 188/26 |
| 6,119,818 A | 9/2000 | Krumbeck et al. | |
| 6,230,849 B1 | 5/2001 | Lumpkin | |
| 6,336,526 B1 * | 1/2002 | Chou | 188/26 |
| 6,390,246 B1 * | 5/2002 | Lee | 188/71.1 |
| 6,431,327 B2 | 8/2002 | Lumpkin | |
| 6,945,369 B1 | 9/2005 | Chen | |
| 7,007,776 B1 | 3/2006 | Lin | |
| 7,011,189 B2 | 3/2006 | Chen | |
| 7,055,655 B2 | 6/2006 | Takizawa et al. | |
| 7,478,707 B2 * | 1/2009 | Choon Chye et al. | 188/26 |
| 7,757,821 B2 * | 7/2010 | Tetsuka et al. | 188/26 |

FOREIGN PATENT DOCUMENTS

| | | |
|---|---|---|
| TW | 476325 | 2/2002 |
| TW | 484573 | 4/2002 |
| TW | 510342 | 11/2002 |
| TW | 559182 | 10/2003 |
| TW | I257360 | 7/2006 |
| TW | M347348 | 12/2008 |

OTHER PUBLICATIONS

Shimano, Exploded View and Parts List brochure, received Feb. 17, 2000, 4 pgs.

* cited by examiner

*Primary Examiner* — Anna Momper
(74) *Attorney, Agent, or Firm* — Michael Best & Friedrich LLP

(57) ABSTRACT

A brake system comprising a brake disc that rotates about a center axis, a brake mount, a brake caliper attached to the brake mount and including a brake pad, and an adjuster between the brake mount and the brake caliper. The adjuster can move the brake pad toward and/or away from the brake disc. In one embodiment, the brake caliper is attached to the brake mount by a post extending through an elongated opening in the brake caliper and nonparallel to the center axis. The adjuster can change a relative location of the post within the elongated opening. The adjuster can include an end that extends into the elongated opening and works against the post. The post can include a fastener threaded to the brake mount in a direction substantially perpendicular to the center axis, and the fastener can extend through an elongated opening in the brake caliper.

23 Claims, 12 Drawing Sheets

BRAKE CALIPER ADJUSTMENT MECHANISM

BACKGROUND

The present invention relates to mechanisms for adjusting the positioned of vehicle brake pads relative to a brake disc.

Disc brakes are increasingly used on vehicles today. The advantages of disc brakes on vehicles are well known. The brakes must be designed to accommodate a large variety of vehicle geometries. Therefore brake calipers commonly utilize oversized slots that the mounting bolts pass through so the brake caliper can be correctly positioned relative to the brake disc.

One drawback commonly found in disc brakes is drag caused by improper setup. Proper setup requires tightening the fasteners that fix the caliper to the vehicle while keeping clearance between the brake pads and brake disc. This is difficult because the caliper is free to move until the mount bolts are tightened. Often after tightening the mount bolts and then rotating the disc brake drag is detected. If the user wants to correct this they must repeat the set up process.

In many cases the user will contact the brake disc with their hands during setup to help keep the brake caliper position relative to the brake disc while tightening the fasteners. This can lead to contamination of the brake disc.

One solution is shown in U.S. Pat. No. 6,431,327 which utilizes a series of convex and concave washers along the mount bolts. This adds another degree of freedom to help align the brake pad surface with the rotor surface. However, this solution is difficult in practice because an additional degree of freedom must be restrained while tightening the mount bolts. In addition, this solution requires four washers on each fastener which adds weight and cost.

Therefore there exists a need to provide a caliper adjustment mechanism that is easy to use, lightweight, and low cost.

SUMMARY

The present invention provides a brake system comprising a brake disc that rotates about a center axis, a brake mount positioned a distance from the brake disc, a brake caliper attached to the brake mount and including a brake pad, and an adjuster between the brake mount and the brake caliper (e.g., threaded into the brake caliper). The adjuster is operable to move the brake pad at least one of toward and away from the brake disc.

In one embodiment, the brake caliper is attached to the brake mount by a post that is nonparallel (e.g., substantially perpendicular) to the center axis. For example, the post can pass through an elongated opening (e.g., elongated in a direction substantially parallel with the center axis) in the brake caliper. Preferably, the adjuster moves the brake pad by changing a relative location of the post within the elongated opening. In this embodiment, the adjuster can include an end that extends into the elongated opening and works against the post. The post can include a fastener threaded to the brake mount in a direction substantially perpendicular to the center axis, and the fastener can extend through an elongated opening in the brake caliper.

In another embodiment, the adjuster works against the brake mount. For example, the brake caliper can include a standoff that locates the adjuster outboard of the brake mount, and the adjuster can be coupled to (e.g., threaded into) the standoff. Preferably, the caliper defines an elongated opening, and the post includes a fastener extending through the elongated opening and threaded into the brake mount in a direction substantially perpendicular to the center axis.

In yet another embodiment, the adjuster works against the brake caliper. For example, the adjuster can be threaded into the brake mount. Preferably, the post includes a fastener threaded into the brake mount and extending in a direction substantially perpendicular to the center axis (e.g., the fastener passes through an elongated opening in the brake caliper).

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
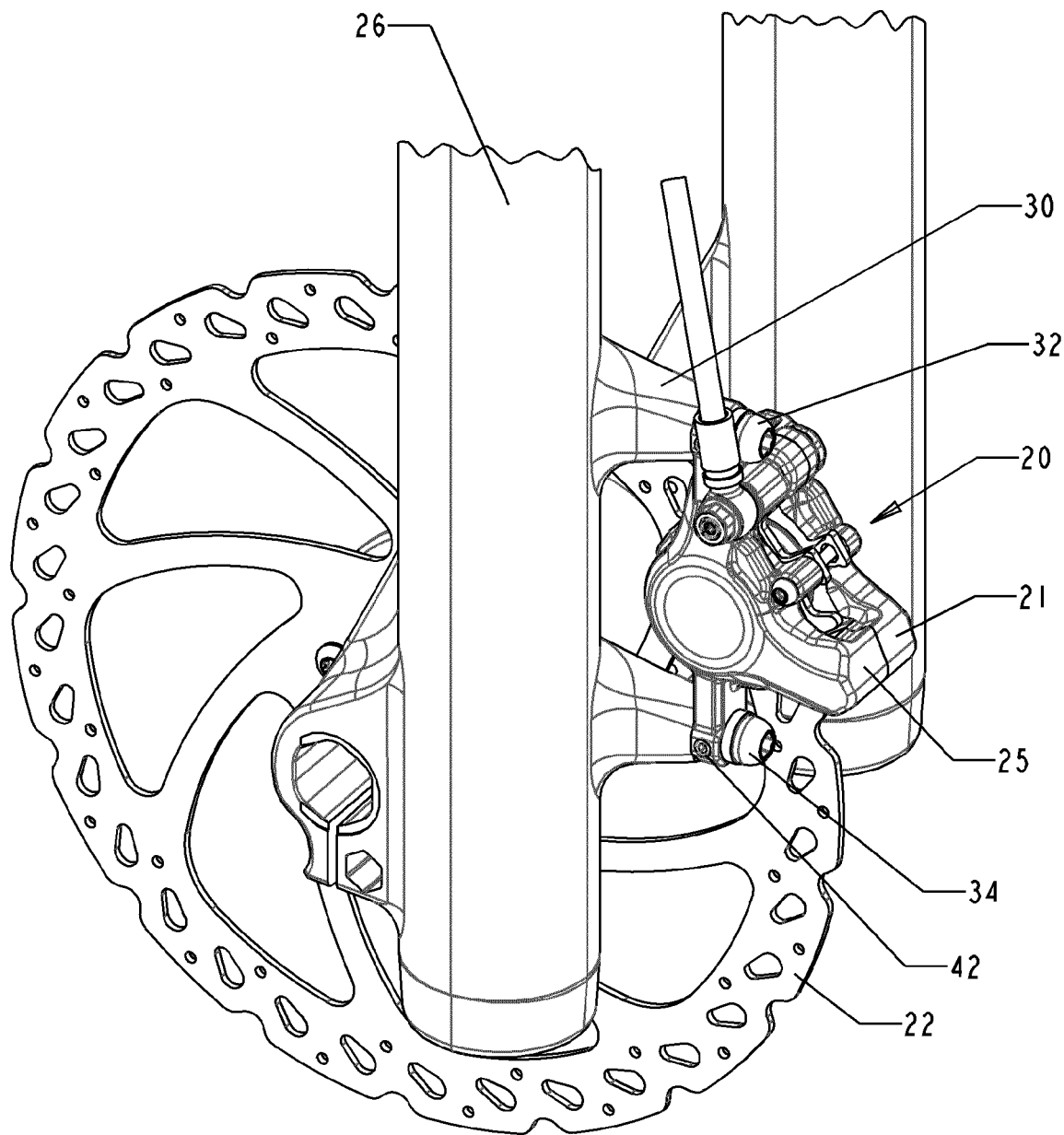
FIG. 1 is a perspective view of the first embodiment.
Figure 2:
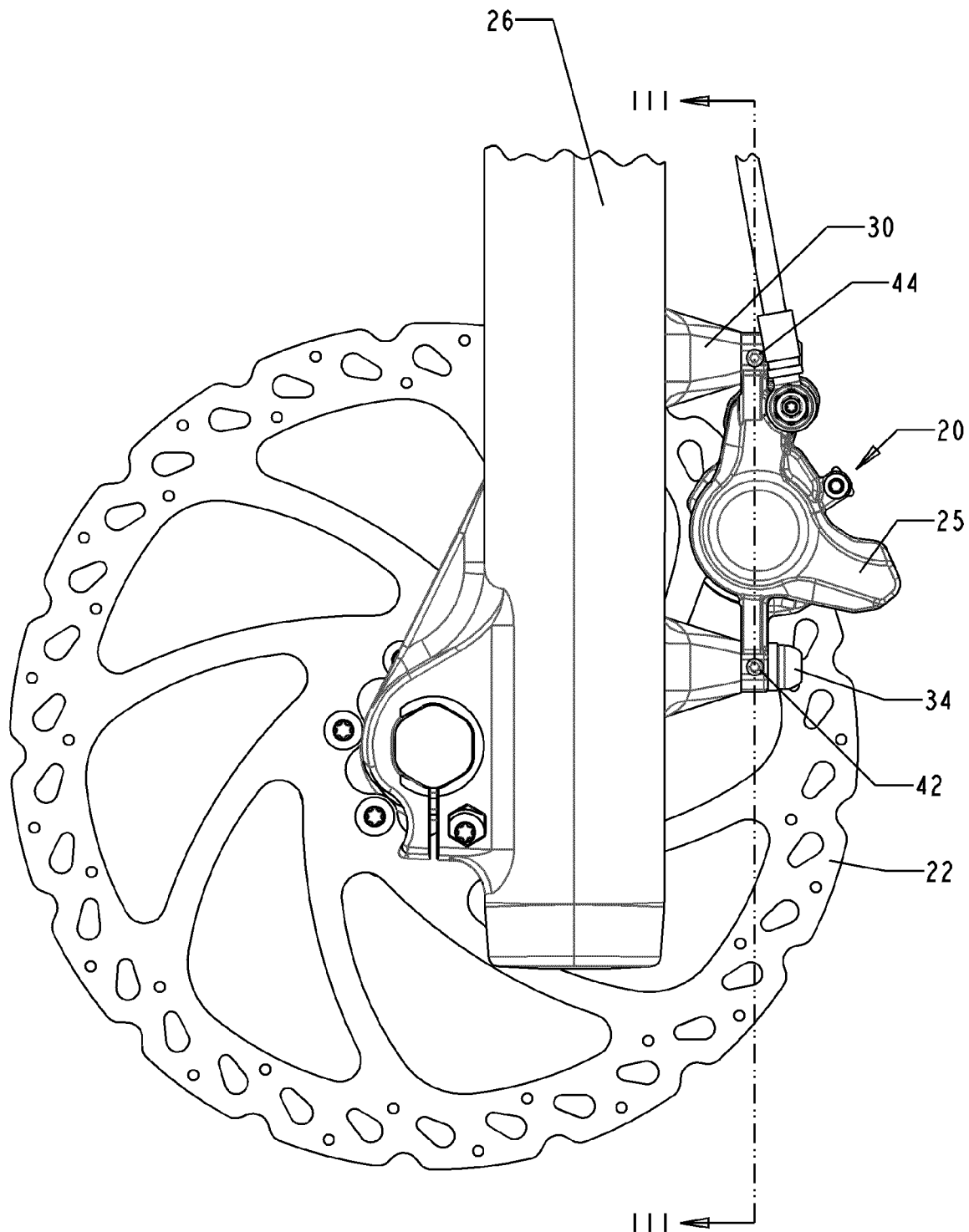
FIG. 2 is a view along the disc center axis.
Figure 3:
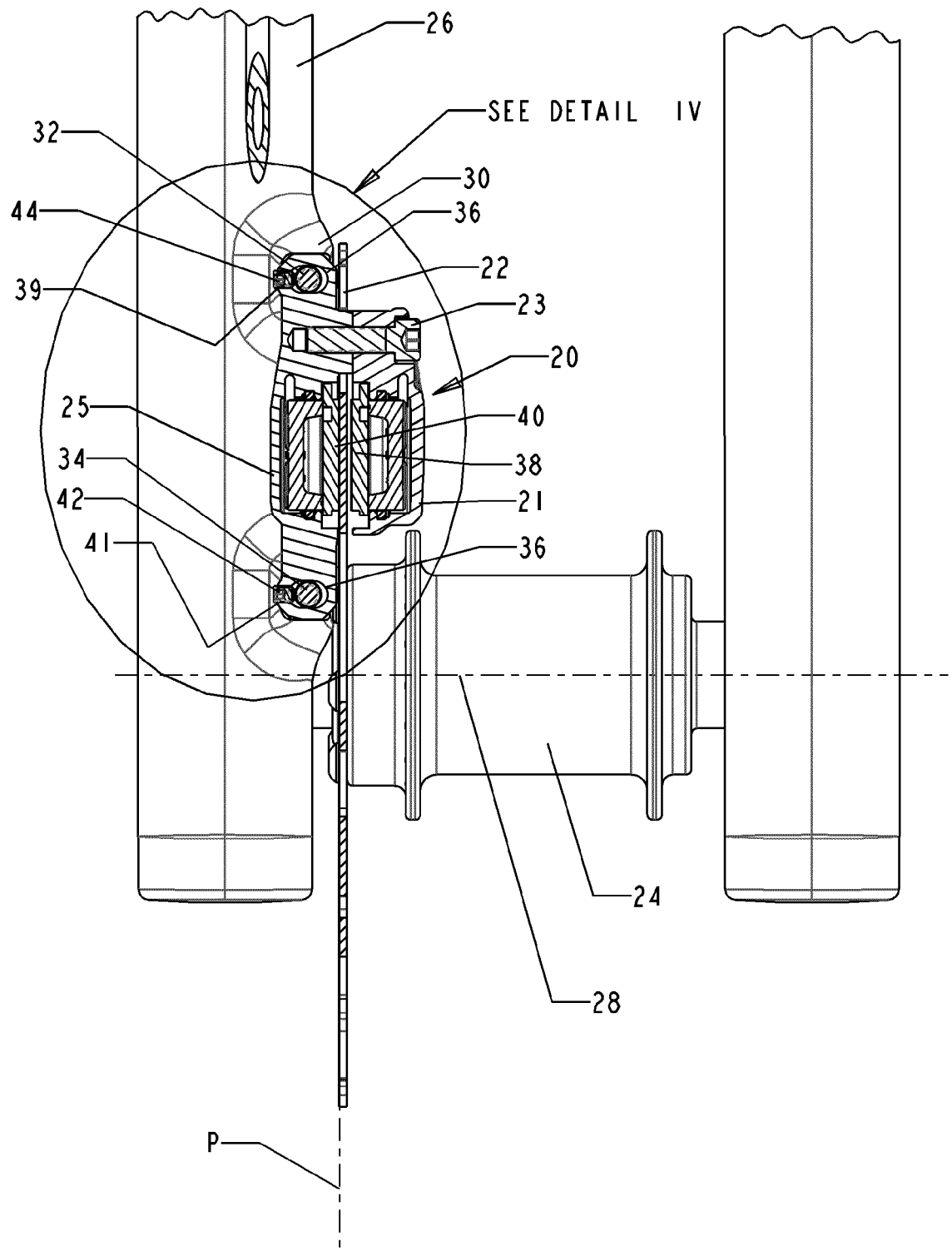
FIG. 3 is a section through line III-III of FIG. 2.

Referring to FIGS. 1-3, a brake disc 22 is mounted to a hub 24 which is rotatably mounted to a fork 26. The brake disc 22 rotates about a center axis 28 and generally within a plane P. A brake mount 30, which in the embodiment of FIGS. 1-5 includes a pair of standoffs formed integrally with and extending away from the fork 26, is located at a fixed position along the brake disc center axis 28 and is therefore fixed relative to the brake disc 22. The brake mount 30 supports a caliper assembly 20 configured to apply braking forces to the brake disc 22. The caliper assembly 20 can be of the hydraulic (as illustrated) or mechanical type. In the illustrated embodiment the caliper assembly 20 has a two-piece caliper housing having an inboard portion 21 coupled by one or more fasteners 23 to an outboard portion 25. In other embodiments the caliper assembly 20 can be of the monoblock type where both the inboard and outboard portions are integrally formed. Moreover, although the drawings and description disclose mounting of the brake caliper assembly 20 on a fork 26, the invention can also be used to set the position of the brake caliper assembly 20 relative to a brake disc 22 at other vehicular mounting locations including frames and brackets.

The caliper assembly 20 includes a mounting portion that is coupled to the brake mount 30 by at least one post. For example, in the illustrated embodiment, the caliper assembly 20 includes two mounting portions that are coupled to the brake mount 30 by an upper mount bolt 32 and a lower mount bolt 34, respectively. The shank portions of the upper and lower mount bolts 32, 34 comprise the posts that support the caliper assembly 20. In other embodiments, the posts may extend outwardly from the brake mount 30 and the caliper assembly 20 may fit over the posts. The ends of the posts can be threaded or otherwise formed to accept a retention member, such as a nut, for securing the caliper assembly 20 to the brake mount.

In the illustrated embodiment, the upper mount bolt 32 extends through an upper elongated opening 36 defined by the caliper 20 and into a threaded opening (not shown) formed in the brake mount 30. The lower mount bolt 34 extends through a lower elongated opening 36 defined by the caliper assembly 20 and into another threaded opening (not shown) formed in the brake mount 30. In the illustrated embodiment, the upper and lower mount bolts 32, 34 are both shown as extending in a direction substantially parallel to the plane of the brake disc 22, substantially parallel to one another, and substantially perpendicular to the longitudinal extent of the fork 26. It should be appreciated however that the upper and lower mount bolts 32, 34 could be oriented differently, for example with one mount bolt extending substantially perpendicular to the longitudinal extent of the fork 26, and another mount bolt extending substantially parallel with the longitudinal extent of the fork 26.

As shown in FIG. 3, the elongated openings 36 are defined by the outboard portion 25 of the caliper assembly 22, and are elongated generally in a direction parallel to the brake disc center axis 28 to provide clearance generally to the inboard and outboard sides of the upper and lower mount bolts 32, 34. In the non-elongated direction (e.g., generally up and down in FIG. 3), the elongated openings 36 are sized to closely receive the upper and lower mount bolts 32, 34.

The brake caliper assembly 20 includes an inner brake pad 38 supported by the inboard portion 21 of the caliper assembly 20 and an outer brake pad 40 supported by the outboard portion 25 of the caliper assembly 20. The brake caliper assembly 20 is positioned such that the inner brake pad 38 is located on the inboard side of the brake disc 22 and the outer brake pad 40 is located on the outboard side of the brake disc 22.

Figure 4:
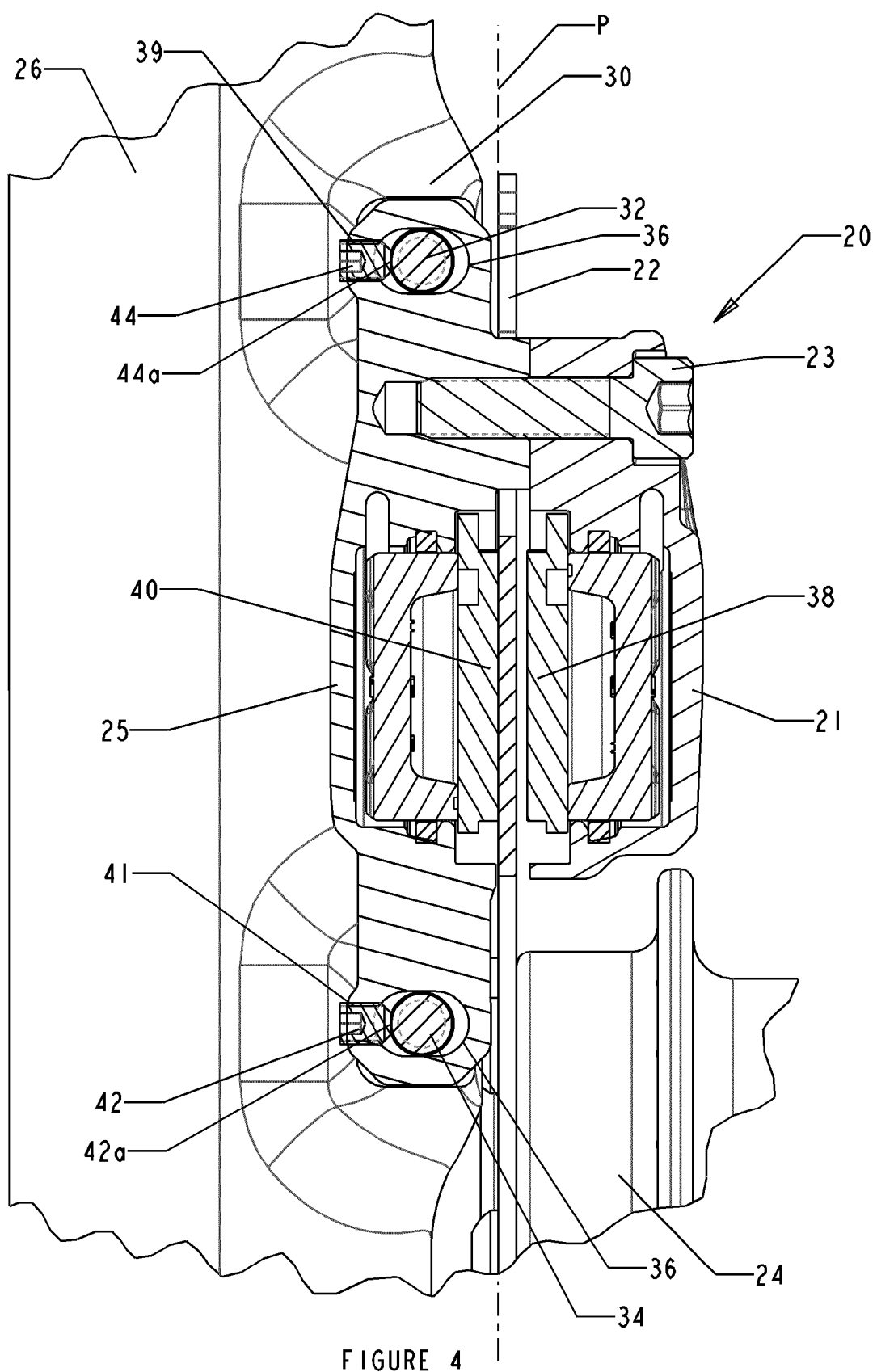
FIG. 4 is a detail of FIG. 3 shown before adjustment.
Figure 5:
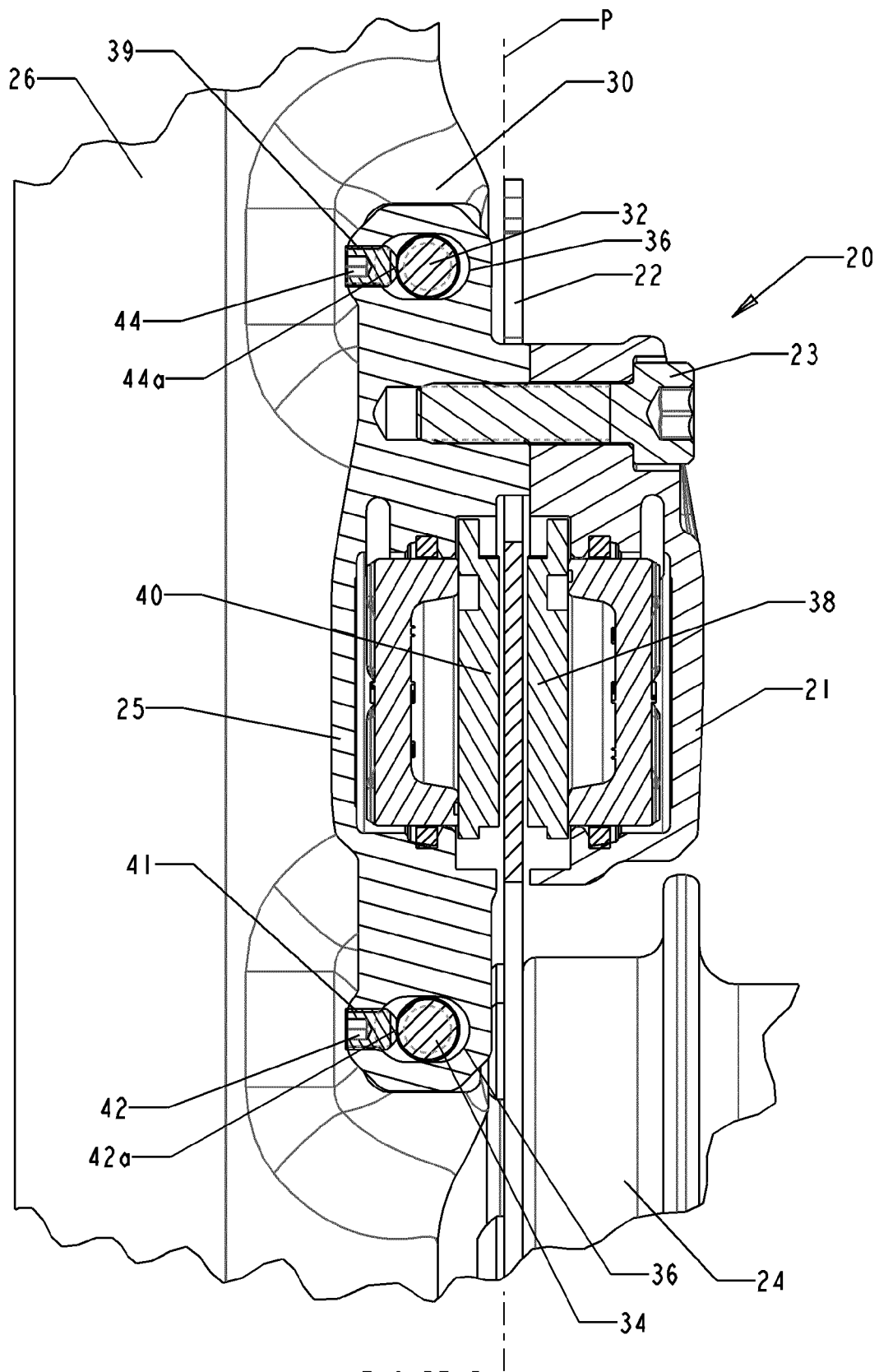
FIG. 5 is a detail of FIG. 3 shown after adjustment.

Referring also to FIGS. 4 and 5, the brake mount 30 and caliper assembly 20 include an adjustment assembly that allows the location of the caliper assembly 20 and the inner and outer brake pads 38, 40 to be adjusted with respect to the brake disc 22 and brake disc plane. In the illustrated embodiment, the outboard portion 25 of the caliper assembly 20 defines an upper adjustment opening 39 and a lower adjustment opening 41 that, in the embodiment of FIGS. 1-5, are oriented substantially parallel to the center axis 28 and that communicate with a respective one of the elongated openings 36. In the illustrated embodiment, both the lower adjustment opening 41 and the upper adjustment opening 39 are threaded to receive an adjuster in the form of a respective lower adjust screw 42 and upper adjust screw 44. Although the illustrated adjusters are in the form of set screws, it should be appreciated that the adjusters could also take the form of other types of screws, fasteners, over-center mechanisms, cams, latches, and the like, all of which may be configured for use or adjustment with or without the use of tools. Moreover, the specific location and orientation of the upper and lower adjustment openings 39, 41, and thus the orientation and location of the upper and lower adjusters 42, 44, can differ from that shown. For example, the upper and lower adjustment openings 39, 41 could alternatively extend into the elongated openings 36 from the inboard side of the caliper assembly 20, or at an angle that is not necessarily parallel with the center axis 28.

Both the upper and lower adjust screws 44, 42 extend through their respective upper and lower adjustment openings 39, 41 and at least partially into the respective elongated openings 36. More specifically, an end 42a of the lower adjust screw 42 extends into the elongated opening 36 and contacts the lower mount bolt 34. Similarly, an end 44a of the upper adjust screw 44 extends into the elongated opening 36 and contacts the upper mount bolt 32. Adjustment of the upper and lower adjust screws 44, 42 alters the relative positioning of the shank portions of the upper and lower mount bolts 32, 34 with respect to the elongated openings, thereby facilitating adjustment of the location of the caliper assembly 20 and the inner brake pad 38 and outer brake pad 40 relative to the brake disc 22 and brake disc plane. Specifically, the upper and lower adjust screws 44, 42 can be used to adjust the transverse location of the caliper assembly 20 in the direction of the center axis 28. Adjustment in the direction of the center axis 28 can be used to center the brake disc 22 between the inner brake pad 38 and the outer brake pad 40. The upper and lower adjust screws 44, 42 can also be used to adjust the angle of the caliper assembly 20 with respect to the brake disc plane. Adjustment of the relative angle of the caliper assembly 20 and the brake disc plane can be used to ensure that the inner brake pad 38 and the outer brake pad 40 are oriented substantially parallel to the brake disc plane.

Figure 6:
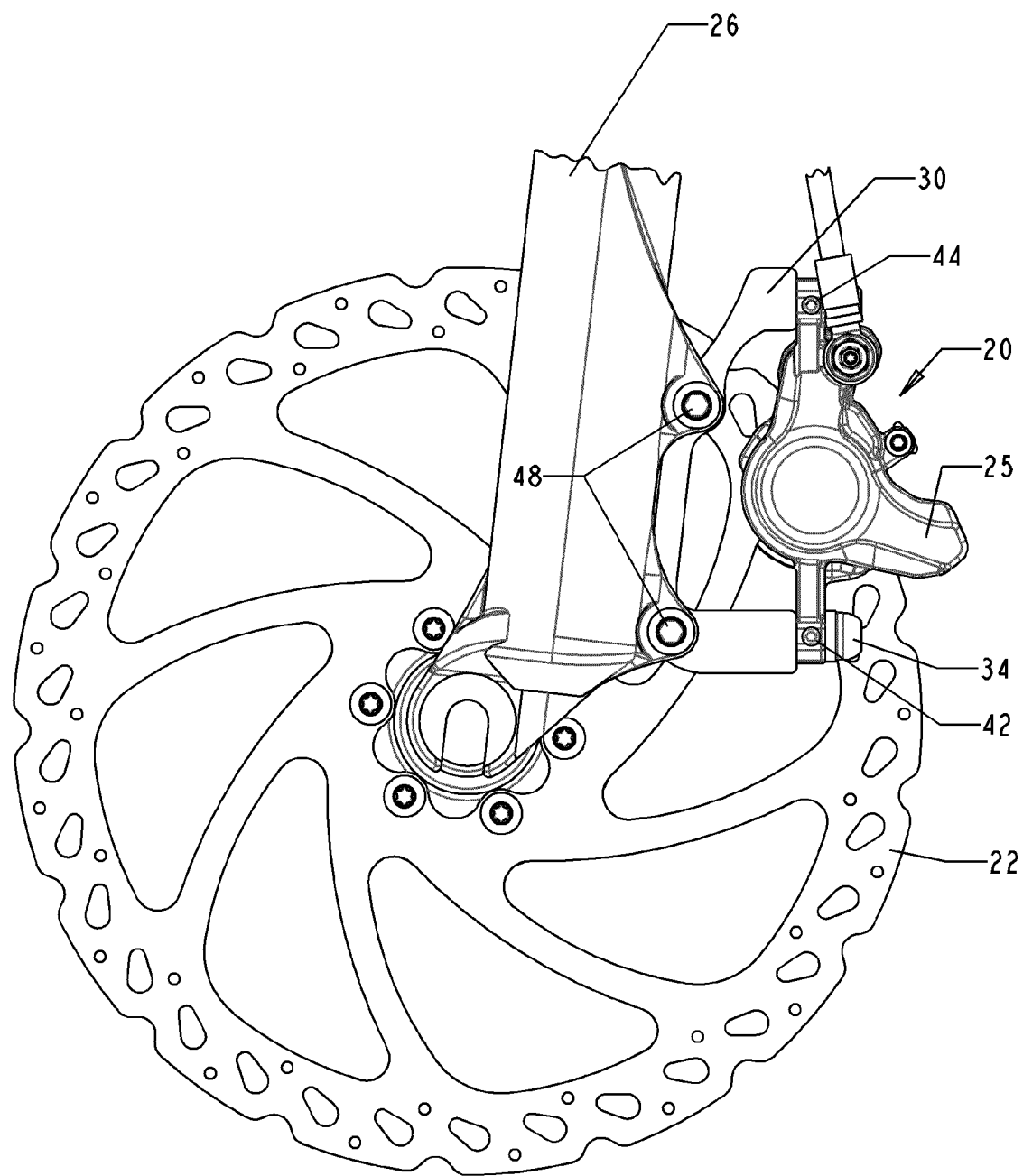
FIG. 6 is an alternate view of FIG. 2 where the brake mount is a bracket.

FIG. 6 illustrates an alternative embodiment where instead of the brake mount 30 being formed integrally with the fork 26, the brake mount 30 is in the form of a bracket that is coupled to the fork 26 with a pair of fasteners 48. Although generally considered less rigid than the integrally-formed brake mount 30 of FIGS. 1-5, the bracket-style brake mount 30 of FIG. 6 allows the same fork 26 to be used with differently sized brake discs 22. Thus, for example, if a larger brake disc 22 is desired, instead of requiring a completely new fork 26, a different bracket-style brake mount 30 having the appropriate geometry for the larger brake disc 22 can be used to properly locate the caliper assembly 20 relative to the larger brake disc 22. The bracket-style brake mount 30 of FIG. 6 includes threaded bores (not shown) having the same spacing as the threaded bores (not shown) formed in the brake mount 30 of FIGS. 1-5. In this regard, the same type or style of upper and lower mount bolts 32, 34, and the same type or style of caliper assembly 20, which includes the elongated openings 36 and upper and lower adjust screws 44, 42, can be used with the bracket-style brake mount 30 of FIG. 6 as with the integrally formed brake-mount 30 of FIGS. 1-5.

To adjust the location with respect to the brake disc 22 of the brake caliper assembly 20 of FIGS. 1-6, the brake caliper assembly 20 is positioned relative to the brake mount 30 so the elongated openings 36 are substantially aligned with the threaded bores in the brake mount 30, and with the outer brake pad 40 contacting the brake disc 22 and the inner brake pad 38 spaced away from the brake disc 22. The upper mount bolt 32 and lower mount bolt 34 are then inserted through the elongated openings 36, threaded into the threaded bores in the brake mount 30, and tightened to a relatively low torque. The relatively low torque is sufficiently tight to hold the caliper assembly 20 fixed in position relative to the brake mount 30 when no force is applied to the caliper assembly, but sufficiently loose so that, upon application of an outside force, the caliper assembly 20 can be moved relative to the brake mount 30, e.g., by sliding the caliper assembly 20 from side-to-side as limited by the fitment of the upper and lower mount bolts 32, 34 in the elongated openings.

To obtain precise adjustment of the location of the caliper assembly 20 and brake pads 38, 40 with respect to the brake disc 22, the lower adjust screw 42 and upper adjust screw 44 are rotated. As best shown in FIGS. 4 and 5, when the lower adjust screw 42 is rotated it moves inwardly and outwardly, depending on the direction of rotation, with respect to the lower elongated opening 36. Upon sufficient movement of the lower adjust screw 42 in the inward direction, the end 42a of the lower adjust screw 42 engages and works against the lower mount bolt 34, which tends to move the lower portion of the brake caliper assembly 20 in an outboard direction (e.g., to the right as viewed in FIGS. 4 and 5). The upper adjust screw 44 similarly can be rotated to move inwardly and outwardly with respect to the upper elongated opening 36. Upon sufficient movement of the upper adjust screw 44 in the inward direction, the end 44a of the upper adjust screw engages and works against the upper mount bolt 32, which tends to move the upper portion of the brake caliper assembly 20 in the outboard direction (e.g., to the right as viewed in FIGS. 4 and 5).

By coordinating the adjustment of the upper and lower adjust screws 44, 42, the outer brake pad 40 is moved away from the brake disc 22 and the inner brake pad 38 to move toward the brake disc 22 such that both the inner brake pad 38 and the outer brake pad 40 have clearance to the brake disc 22. Coordinated adjustment of the upper and lower adjust screws 44, 42 can also be used to change the angle of the caliper assembly 20 relative to the brake disc 22 to thereby ensure that the brake pads 38, 40 are oriented substantially parallel to the brake disc 22. Once the caliper assembly 20 is in the appropriate location, the lower mount bolt 34 is tightened to a final higher torque sufficient to prevent substantially any movement of the lower portion of the brake caliper assembly 20. While applying the final torque to the lower mount bolt 34, which tends to rotate the brake caliper assembly 20 about the lower mount bolt 34 in a clockwise direction as viewed in FIGS. 4 and 5, rotation of the brake caliper assembly 20 is prevented by the contact between the end 44a of the upper adjust screw 44 and the upper mount bolt 32. Once the lower mount bolt 34 is tightened to the final higher torque, the upper mount bolt 32 is tightened to a final higher torque.

Figure 7:
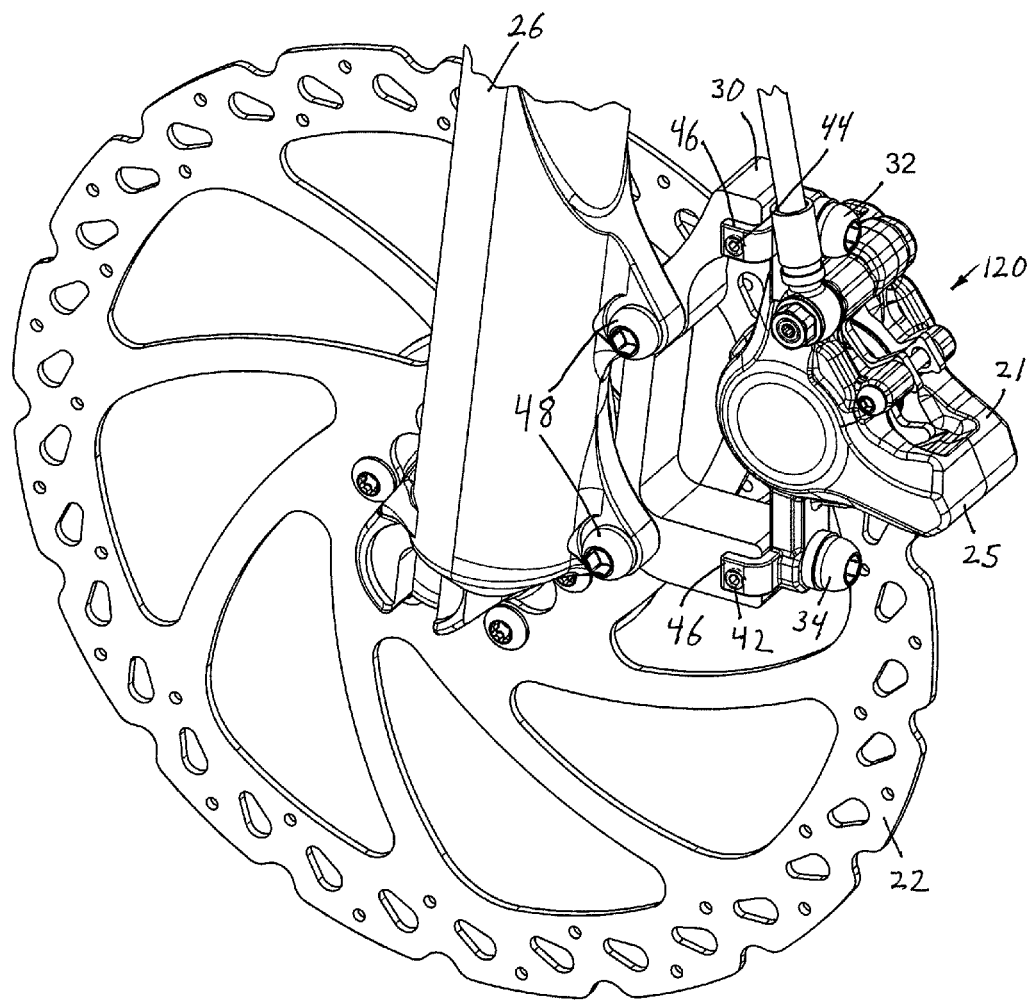
FIG. 7 is a perspective view of an alternate embodiment.
Figure 8:
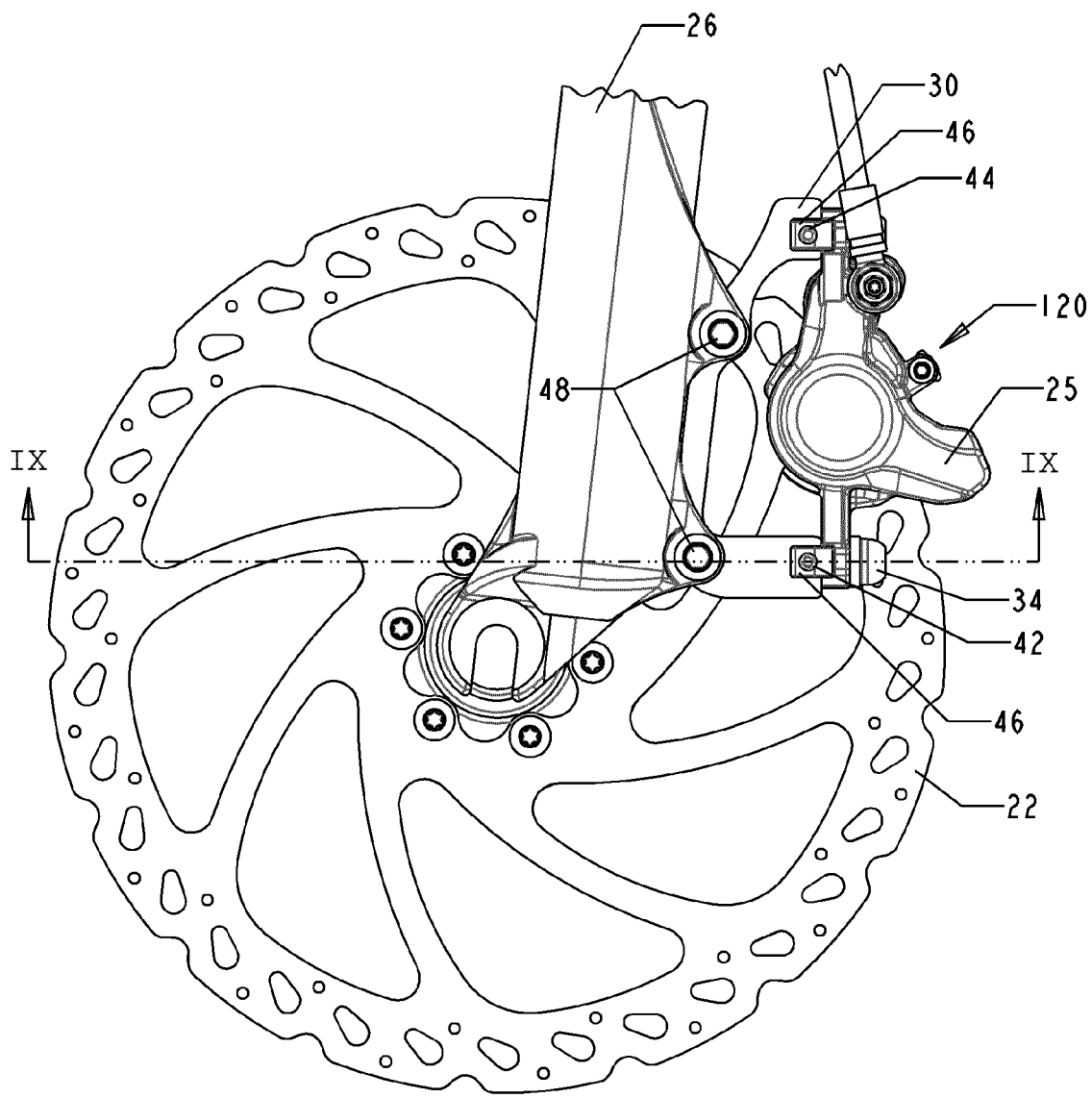
FIG. 8 is a view along the disc center axis of the alternate embodiment of FIG. 7.
Figure 9:
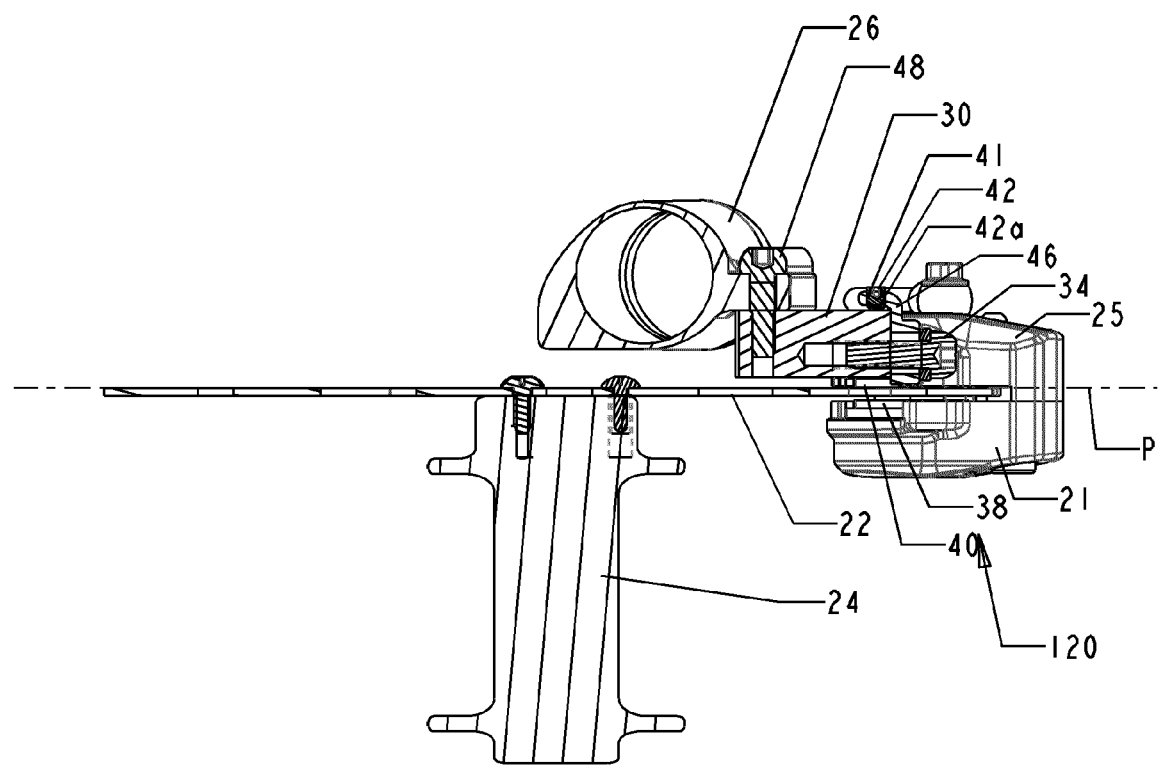
FIG. 9 is a section through line IX-IX of FIG. 8.

Referring to FIGS. 7-9, in an alternate embodiment, caliper assembly 120 includes a pair of substantially L-shaped standoffs 46 (one upper and one lower) that extend from the outboard portion 25 of the caliper assembly 120 first in an outboard direction and then toward the fork 26. In the embodiment of FIGS. 7-9, each standoff 46 defines the respective upper or lower adjustment opening 39, 41 that receives the respective upper or lower adjust screw 44, 42. The standoffs 46 are fixed with respect to the caliper assembly 20 and position the upper adjust screw 44 and lower adjust screw 42 at a location outboard of the brake mount 30 such that the end 44a of the upper adjust screw 44 and the end 42a of the lower adjust screw 42 engage and work against the brake mount 30 to adjust the lateral and angular position of the caliper assembly 120 with respect to the brake disc 22. Adjustment of the location of the brake caliper assembly 120 is the same as already described for FIG. 1-6 except the upper adjust screw 44 and lower adjust screw 42 engage and work against the brake mount 30.

Figure 10:
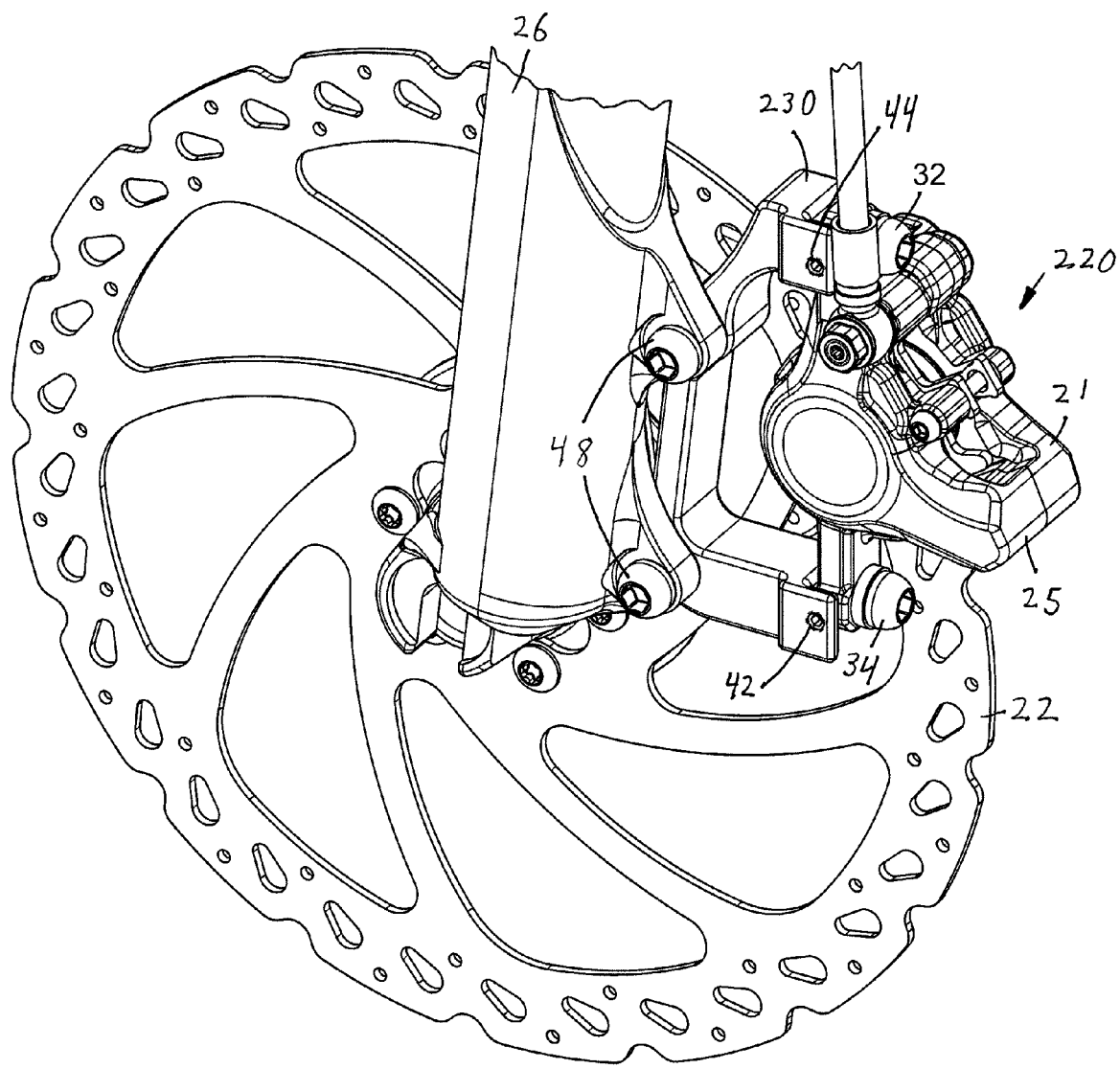
FIG. 10 is a perspective view of another alternate embodiment.
Figure 11:
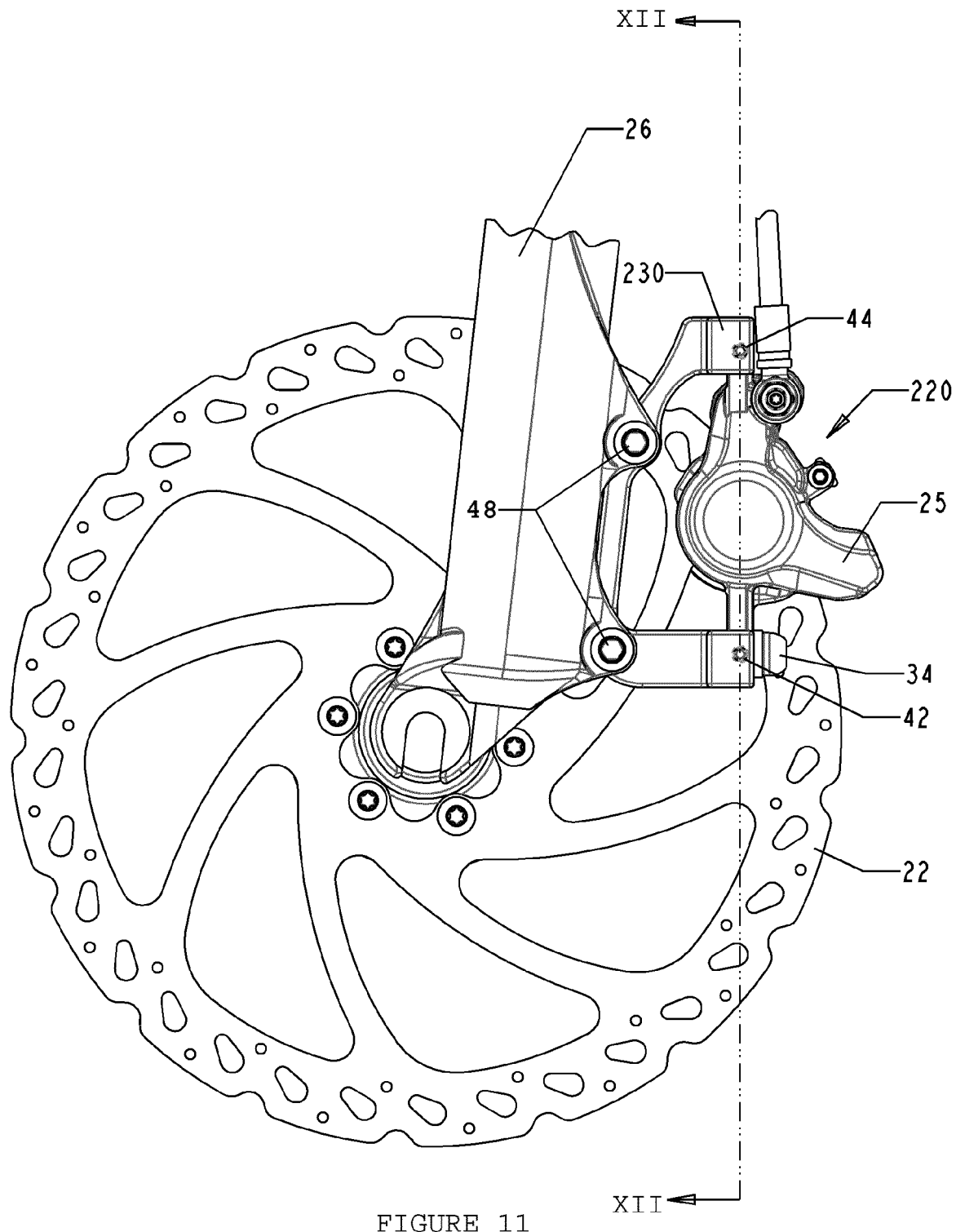
FIG. 11 is a view along the disc center axis of the alternate embodiment of FIG. 10.
Figure 12:
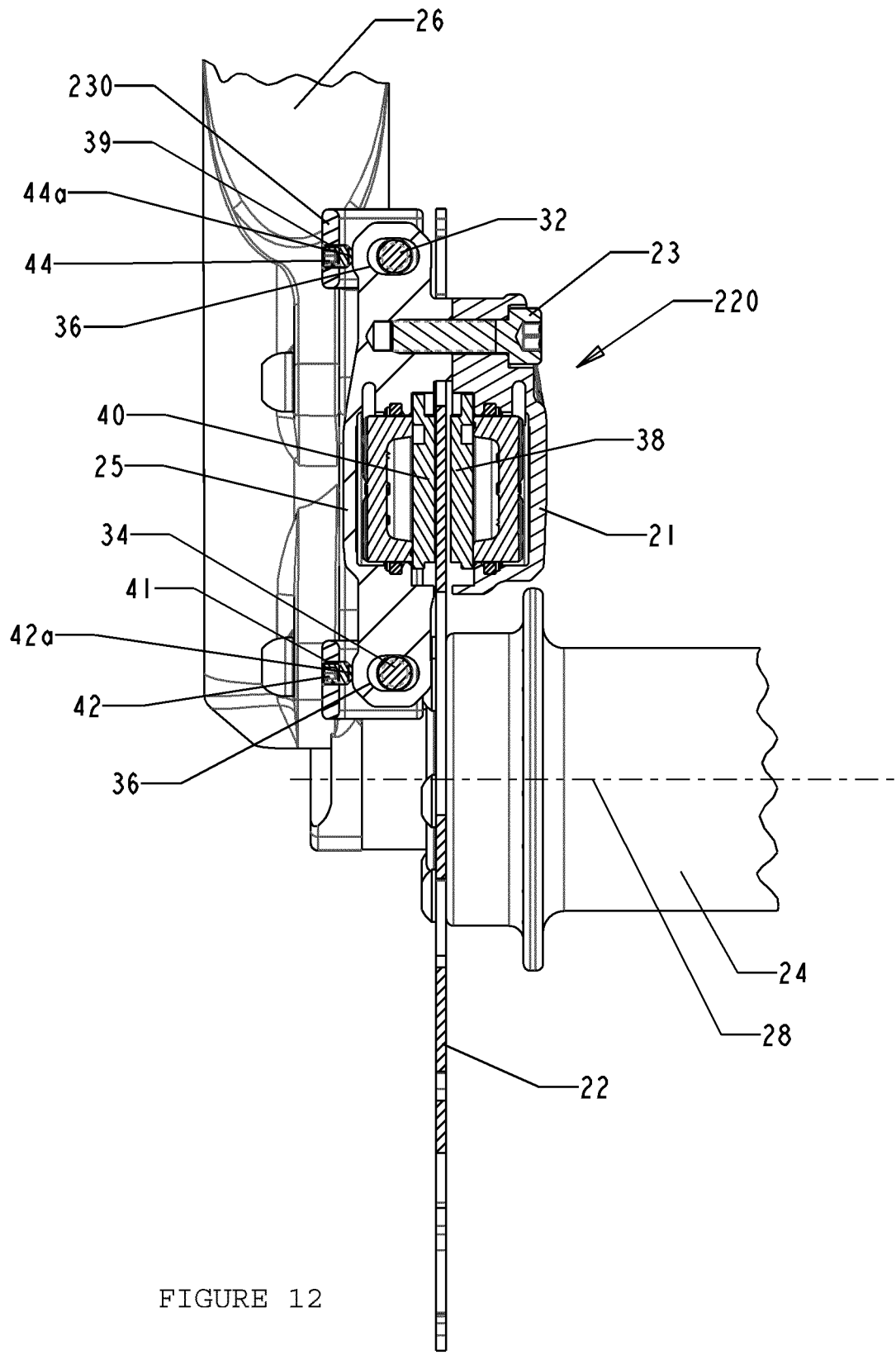
FIG. 12 is a section through line XII-XII of FIG. 11.

Referring to FIGS. 10-12, in yet another alternate embodiment the adjustment openings 39, 41 are formed in the brake mount 230, such that upper adjust screw 44 and lower adjust screw 42 extend through the brake mount 230 and engage the brake caliper assembly 230. More specifically, as best shown in FIG. 12, the end 44a of the upper adjust screw 44 extends through the brake mount 230 and contacts the upper end of the outboard portion 25 of the brake caliper assembly 230. Similarly, the end 42a of the lower adjust screw 42 extends through the brake mount 230 and contacts the lower end of the outboard portion 25 of the brake caliper assembly 230. Adjustment of the upper and lower adjust screws 44, 42 facilitates adjustment of the location and relative angle of the inner brake pad 38 and outer brake pad 40 with respect to the brake disc 22. As shown in FIG. 12, the elongated openings 36 are still formed in the caliper assembly 230 and allow the caliper assembly 230 to be moved side to side relative to the upper and lower mount bolts 32, 34.

In the embodiment of FIGS. 10-12, tightening the upper and lower adjust screws 44, 42 tends to move the caliper inboard, which is the opposite result of tightening the upper and lower adjust screws 44, 42 in the embodiments of FIGS. 1-9. Thus, although the same overall strategy is used, the specific procedure for adjusting the location of the brake caliper assembly 220 relative to the brake disc 22 differs slightly. Specifically, the brake caliper assembly 220 is positioned on the brake mount 230 with the inner brake pad 38 contacting the brake disc 22 and the outer brake pad 40 spaced away from the brake disc 22. The upper mount bolt 32 and lower mount bolt 34 are then tightened to a relatively low torque sufficient to substantially prevent movement of the caliper assembly 220 relative to the brake disc 22 in the absence of an outside force, but to allow movement of the caliper assembly 220 relative to the brake disc 22 upon application of a sufficiently large outside force.

With the upper and lower mount bolts 32, 34 tightened to the relatively low torque, the lower adjust screw 42 and the upper adjust screw 44 are adjusted. For example, when the lower adjust screw 42 and the upper adjust screw 44 are rotated in the clockwise direction, the respective ends 42a, 44a engage and work against the brake caliper assembly 220. Continued rotation (e.g., tightening) of the lower adjust screw 42 and the upper adjust screw 44 moves the brake caliper assembly 220 in the inboard direction, thereby causing the inner brake pad 38 to move away from the brake disc 22 and the outer brake pad 40 to move toward the brake disc 22. Adjustment of the upper and lower adjust screws 44, 42 continues until both the inner brake pad 38 and the outer brake pad 40 have clearance to the brake disc 22, and the inner and outer brake pads 38, 40 are oriented substantially parallel to the brake disc 22. The upper mount bolt 32 can then be tightened to a final higher torque. While applying torque to the upper mount bolt 32, which tends to cause the caliper assembly 220 to rotate about the upper mount bolt 32 in a clockwise direction as viewed in FIG. 12, such rotation of the brake caliper assembly 220 is prevented by the contact of the lower adjust screw 42 to the brake caliper assembly 220. Once the upper mount bolt 32 is tightened to the final higher torque, the lower mount bolt 34 is tightened to the final higher torque.

Various features and advantages of the invention are set forth in the following claims.

What is claimed is:

1. A brake system comprising:
   a brake disc that rotates about a center axis;
   a brake mount positioned a distance from the brake disc;
   a brake caliper attached to the brake mount, the brake caliper supporting a first brake pad positioned on a first side of the brake disc and a second brake pad on a second side of the brake disc; and
   an adjuster between the brake mount and the brake caliper, the adjuster operable for translational movement relative to the brake caliper that concurrently moves the first brake pad away from the brake disc and moves the second brake pad toward the brake disc.

2. The brake system of claim 1, wherein the brake caliper is attached to the brake mount by a post that is nonparallel to the center axis.

3. The brake system of claim 2, wherein the post extends from the brake mount in a direction substantially perpendicular to the center axis.

4. The brake system of claim 2, wherein the post passes through an elongated opening in the brake caliper.

5. The brake system of claim 4, wherein the elongated opening is elongated in a direction substantially parallel with the center axis.

6. The brake system of claim 4, wherein the adjuster moves the brake pad by changing a relative location of the post within the elongated opening.

7. The brake system of claim 4, wherein the adjuster includes an end that extends into the elongated opening and works against the post.

8. The brake system of claim 7, wherein the adjuster is threaded into the brake caliper.

9. The brake system of claim 2, wherein the post includes a fastener threaded to the brake mount in a direction substantially perpendicular to the center axis.

10. The brake system of claim 9, wherein the fastener extends through an elongated opening in the brake caliper.

11. The brake system of claim 1, wherein the adjuster is threaded into the brake caliper.

12. The brake system of claim 1, wherein the adjuster works against the brake mount.

13. The brake system of claim 12, wherein the brake caliper includes a standoff that locates the adjuster outboard of the brake mount, and wherein the adjuster is threaded into the standoff.

14. The brake system of claim 13, wherein the brake caliper is attached to the brake mount by a post, wherein the caliper defines an elongated opening, and wherein the post includes a fastener extending through the elongated opening and threaded into the brake mount in a direction substantially perpendicular to the center axis.

15. The brake system of claim 1, wherein the adjuster works against the brake caliper.

16. The brake system of claim 15, wherein the adjuster is threaded into the brake mount.

17. The brake system of claim 16, wherein the brake caliper is attached to the brake mount by a post, wherein the post includes a fastener threaded into the brake mount and extending in a direction substantially perpendicular to the center axis.

18. The brake system of claim 17, wherein the fastener passes through an elongated opening in the brake caliper.

19. The brake system of claim 1, further comprising a fastener coupling the brake caliper to the brake mount.

20. The brake caliper system of claim 19, wherein the adjustor is operable to move the first brake pad away from the brake disc and move the second brake pad toward the brake disc when the fastener couples the brake caliper to the brake mount.

21. The brake caliper system of claim 1, wherein rotation of the adjuster concurrently moves the first brake pad away from the brake disc and moves the second brake pad toward the brake disc.

22. A brake caliper comprising:
  a caliper housing including a mounting portion adapted to be secure to a brake mount;
  a brake pad supported by the caliper housing; and
  an adjustment mechanism translationally movable relative to the mounting portion and adapted to move the caliper housing relative to the brake mount.

23. The brake caliper of claim 22, wherein the adjustment mechanism is threaded into the mounting portion.

\* \* \* \* \*